US012675172B2

(12) United States Patent
    Lai

(10) Patent No.: US 12,675,172 B2
(45) Date of Patent: Jul. 7, 2026

(54) MOUSE DEVICE, MOUSE FOOT, AND BATCH MANUFACTURING METHOD OF MOUSE FEET REPLACEMENT ASSEMBLY

(71) Applicant: E-CENTURY TECHNICAL & INDUSTRIAL CORPORATION, New Taipei City (TW)

(72) Inventor: I-Kuang Lai, New Taipei City (TW)

(73) Assignee: E-CENTURY TECHNICAL & INDUSTRIAL CORPORATION, New Taipei City (TW)

( * ) Notice: Subject to any disclaimer, the term of this patent is extended or adjusted under 35 U.S.C. 154(b) by 0 days.

(21) Appl. No.: 18/810,949

(22) Filed: Aug. 21, 2024

(65) Prior Publication Data

US 2025/0224817 A1    Jul. 10, 2025

(30) Foreign Application Priority Data

Jan. 4, 2024    (TW) ................................. 113100450

(51) Int. Cl.
    *G06F 3/0354*        (2013.01)
    *G05B 19/418*        (2006.01)
(52) U.S. Cl.
    CPC ...   *G06F 3/03543* (2013.01); *G05B 19/41865* (2013.01); *G05B 2219/32077* (2013.01)
(58) Field of Classification Search
    CPC .......... G06F 3/03543; G05B 19/41865; G05B 2219/32077
    See application file for complete search history.

(56)                References Cited

U.S. PATENT DOCUMENTS

| | | | | |
|---|---|---|---|---|
| 2001/0050673 A1* | 12/2001 | Davenport | .......... | G06F 3/03543 |
| | | | | 345/163 |
| 2003/0160766 A1* | 8/2003 | Gordon | ............... | G06F 3/03543 |
| | | | | 345/163 |
| 2007/0069088 A1* | 3/2007 | Bidiville | ............. | G06F 3/03543 |
| | | | | 248/188.9 |
| 2008/0048981 A1* | 2/2008 | Chen | ................... | G06F 3/03543 |
| | | | | 345/163 |
| 2008/0129695 A1* | 6/2008 | Li | ........................ | G06F 3/03543 |
| | | | | 345/163 |
| 2008/0150895 A1* | 6/2008 | Yu | ........................ | G06F 3/03543 |
| | | | | 345/163 |
| 2009/0201251 A1* | 8/2009 | Lo | ........................ | G06F 3/03543 |
| | | | | 345/163 |
| 2010/0026652 A1* | 2/2010 | Hirshberg | ............. | G06F 3/0489 |
| | | | | 345/184 |
| 2019/0391673 A1* | 12/2019 | Tan | ........................ | G06F 3/0317 |

* cited by examiner

*Primary Examiner* — Ariel A Balaoing
(74) *Attorney, Agent, or Firm* — HDLS IPR SERVICES; Chun-Ming Shih

(57)                ABSTRACT

This disclosure is directed to a mouse foot, which includes a body and a boss. The body has an adhesive surface and a top, and the adhesive surface and the top are arranged on opposite sides of the body. The boss is arranged on the top of the body. The boss has at least one convex part and at least one concave part. A height difference is defined between the convex part and the concave part adjacent to each other, and a rounded corner is formed on an edge of the convex part.

6 Claims, 9 Drawing Sheets

MOUSE DEVICE, MOUSE FOOT, AND BATCH MANUFACTURING METHOD OF MOUSE FEET REPLACEMENT ASSEMBLY

BACKGROUND OF THE DISCLOSURE

Technical Field

The present disclosure relates to a mouse foot, and more particularly relates to a low friction mouse foot, a mouse device with the mouse foot, and a batch manufacturing method of mouse feet replacement assembly.

Related Art

Ceramic mouse is a common input device used in computers, where the mouse slides over a work surface to generate a displacement signal for input to the device, and the mouse has a number of foot pads (or feet) on the bottom to allow the mouse to slide across the work surface.

When a related art mouse is used, a surface of the mouse with the feet is flatly attached on the work surface, resulting in large contact area and excessive friction between the feet and the work surface, and leading to unsmooth operation. Obviously, these feet have difficulties to satisfy the requirements for strenuous and precise operation in e-sports.

Therefore, how to design a mouse according to the present disclosure to improve the aforementioned technical deficiencies is a main issue for the present discloser to overcome.

SUMMARY OF THE DISCLOSURE

The present disclosure is directed to a low friction mouse foot, a mouse device with the mouse foot, and a batch manufacturing method of mouse feet replacement assembly.

The present disclosure provides a mouse foot including a body and a boss. The body has an adhesive surface and a top, and the adhesive surface and the top are configured on opposite sides of the body respectively. The boss is arranged on the top of the body, and the boss includes at least one convex part and at least one concave part with a height difference between the convex part and the concave part adjacent to each other, and a rounded corner formed on an edge of the convex part.

In an embodiment of the present disclosure, the boss includes a plurality of convex parts, and the concave part surrounds the convex parts.

In an embodiment of the present disclosure, the convex parts are bumps. The convex parts are arranged concentrically. Some of the convex parts are arranged in a ring and connected to each other.

In an embodiment of the present disclosure, the boss has a plurality of concave parts, and the convex part surrounds the concave parts. The concave parts are arranged concentrically, and the concave parts are dimples.

In an embodiment of the present disclosure, the adhesive surface is coated with an adhesive.

The present disclosure also provides a mouse device, including a bottom case and a plurality of aforementioned mouse feet. The bottom case has a bottom surface. The mouse feet are installed on the bottom surface.

In an embodiment of the present disclosure, the adhesive surface is coated with an adhesive, and the adhesive surface is adhered to the bottom surface by the adhesive.

The mouse foot of the present disclosure is attached on the bottom surface of a mouse, and when the mouse is used on a tabletop, the convex part of the mouse foot contacts the tabletop. Since the edges of the convex part have rounded corners, the mouse may rub the rounded corner to have a lower resistance when it moves on the tabletop.

The present disclosure also provides a batch manufacturing method of mouse feet replacement assembly, and the method includes the steps of: providing a plurality of mouse feet as mentioned above and a fixture, the fixture including a positioning surface and a plurality of grooves corresponding to the mouse feet and formed on the positioning surface; putting the mouse feet into the corresponding grooves respectively, and exposing each adhesive surface of the mouse feet to the outside; providing a release film, attaching the release film to the positioning surface and attaching each adhesive surface; providing a cutting device to cut the release film along the outline of the mouse feet to complete a plurality of release sheets, and attaching the release sheets on the mouse feet respectively.

In an embodiment of the present disclosure, the cutting device includes a knife with a shape corresponding to the outline of the mouse feet.

In an embodiment of the present disclosure, the positioning surface is punched by the knife while cutting the release film along the outline of the mouse feet.

In an embodiment of the present disclosure, the release film together with the mouse feet are removed from the fixture first, and then the knife is used to punch on a surface of the release film having the mouse feet.

In an embodiment of the present disclosure, the cutting device is a laser cutting device.

In an embodiment of the present disclosure, the adhesive surface of each mouse feet is coated with an adhesive, and the release film is adhered to each mouse feet by the adhesive.

In an embodiment of the present disclosure, the adhesive surface of each mouse foot is coated with an adhesive, and each release sheet is adhered to the corresponding mouse foot by the adhesive.

In an embodiment of the present disclosure, each of the adhesive surfaces is substantially flush with the positioning surface.

The batch manufacturing method of mouse feet replacement assembly of the present disclosure can cut a plurality of release sheets from the release film according to the outline of the mouse foot and make the release sheets adhere to the adhesive surface of each mouse foot separately to protect the adhesive surface. This enables manufacturers to produce the mouse feet replacement assembly of the present disclosure by batch production.

DETAILED DESCRIPTION OF THE DISCLOSURE

In the description of the present disclosure, it is to be understood that the orientation or positional relationship indicated by the terms "front", "rear", "left", "right", "front end", "rear end", "end", "longitudinal", "transverse", "vertical", "top", "bottom", etc. is based on the orientation or positional relationship shown in the accompanying drawings, the terms are intended solely to facilitate and simplify the description of the present disclosure, and do not indicate or imply that the device or component referred to must have a particular orientation, be constructed and operated in a particular orientation, and therefore should not be construed as a limitation on the present disclosure.

Terms such as "first", "second", "third", "fourth" and "fifth" describe each element, component, region, layer and/or part, which should not be limited by these terms. These terms may only be used to distinguish one element, component, region, layer or part from another. The terms such as "first", "second", "third", "fourth" and "fifth" as used herein do not imply order or subordination unless the context clearly indicates otherwise.

As used herein and not otherwise defined, the terms "substantially" and "approximately" are used to describe and recount small changes. When combined with an event or circumstance, the terms may include the precise moment of occurrence of the event or circumstance, and the approximation of the occurrence of the event or circumstance to a point of proximity.

The technical characteristics of this disclosure will become apparent with the detailed description accompanied with the illustration of related drawings as follows. It is noteworthy that the embodiments and drawings disclosed herein are to be considered illustrative rather than restrictive.

Figure 1:
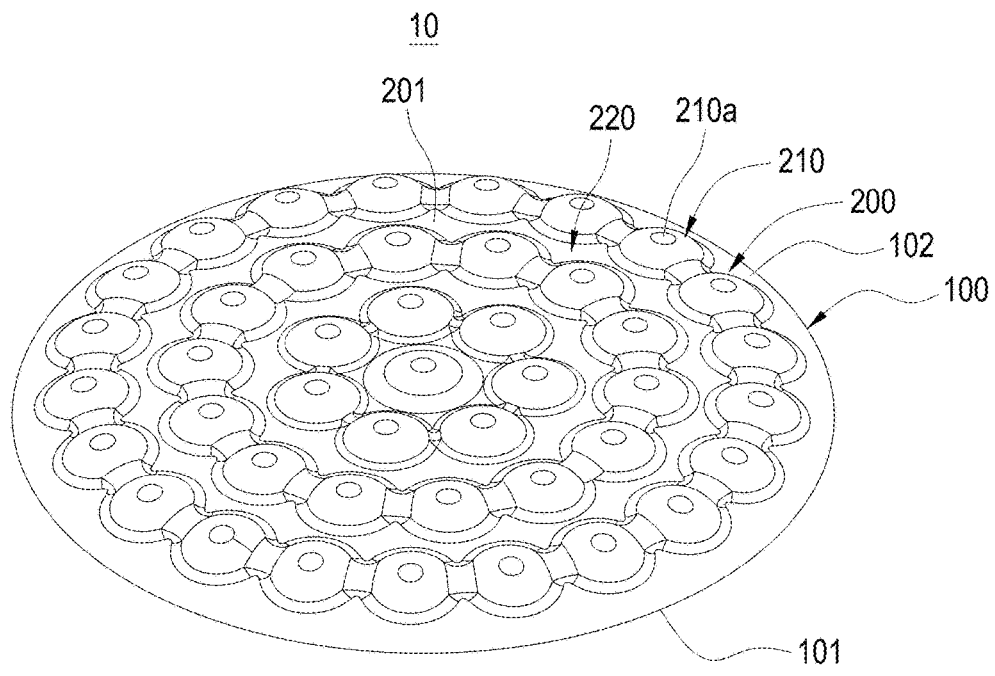
FIG. 1 is a perspective view of a mouse feet in accordance with a first embodiment of this disclosure.
Figure 2:
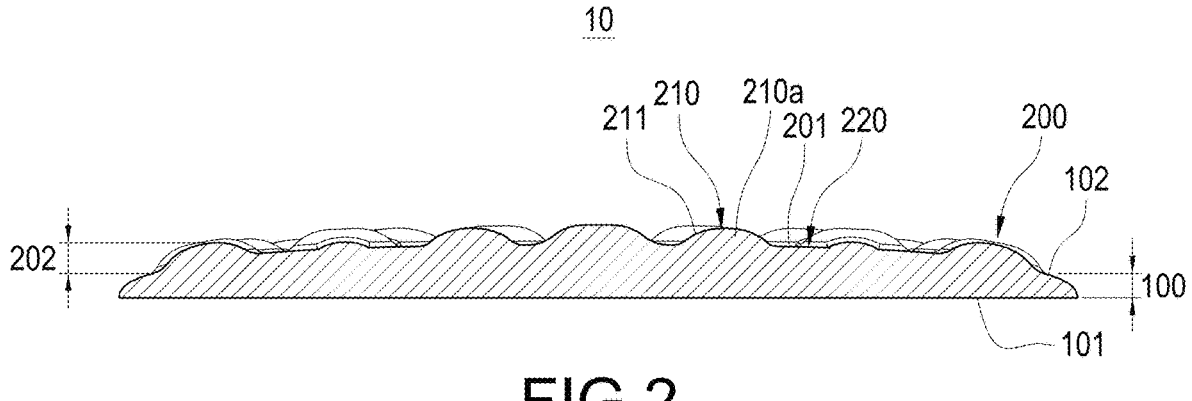
FIG. 2 is a cross-sectional view of a mouse feet in accordance with the first embodiment of this disclosure.

With reference to FIGS. 1 and 2 for the first embodiment of the present disclosure, the first embodiment provides a mouse foot 10, which includes a body 100 and a boss 200.

In this embodiment, the body 100 is substantially in the shape of a sheet, and the body 100 has an adhesive surface 101 and a top 102, and the adhesive surface 101 and the top 102 are arranged on opposite sides of the body 100 respectively. In this embodiment, the adhesive surface 101 is a flat surface, and the top 102 of the present disclosure is not limited to this shape. The adhesive surface 101 is coated with an adhesive 110, where the adhesive 110 is a laminating or dispensing glue.

The boss 200 is arranged on the top 102 of the body 100. In this embodiment, the body 100 and the boss 200 are integrally formed (formed in one piece) by plastic molding, but the present disclosure is not limited to such arrangement. The boss 200 has at least one convex part 210 and at least one concave part 220 with a height difference 202 between the convex part 210 and the concave part 220 adjacent to each other, and a round corner 211 formed on an edge of the convex part 210. The rounded corner 211 has a radius of curvature greater than or equal to 0.5 mm and less than or equal to 5.0 mm.

In this embodiment, the specific configuration of the convex part 210 and the concave part 220 is described in detail below. The boss 200 has a plurality of convex parts 210 and a concave part 220, and the concave part 220 surrounds the convex parts 210. In an embodiment, the boss 200 has a top surface 201 with a plurality of bumps 210 formed on the top surface 201, where the top surface 201 is defined as the concave part 220, the bumps 210a are defined as the plurality of convex parts 210, and each bump 210a is curved and forms a rounded corner 211 on the bump 210a.

In this embodiment, the convex parts 210 are arranged around one of the convex parts 210 (hereinafter referred to as the "center"), and other convex parts 210 are arranged around the center to form a plurality of concentric ring arrangements. Moreover, each convex part 210 in each ring arrangement is extendable to connect other adjacent convex parts 210, so that each ring arrangement forms a circle, such that the rounded corner 211 is extendable to the extending position between the convex parts 210. In addition, in at least one of the ring arrangements, the convex parts 210 are symmetrically configured on the boss 200.

Figure 3:
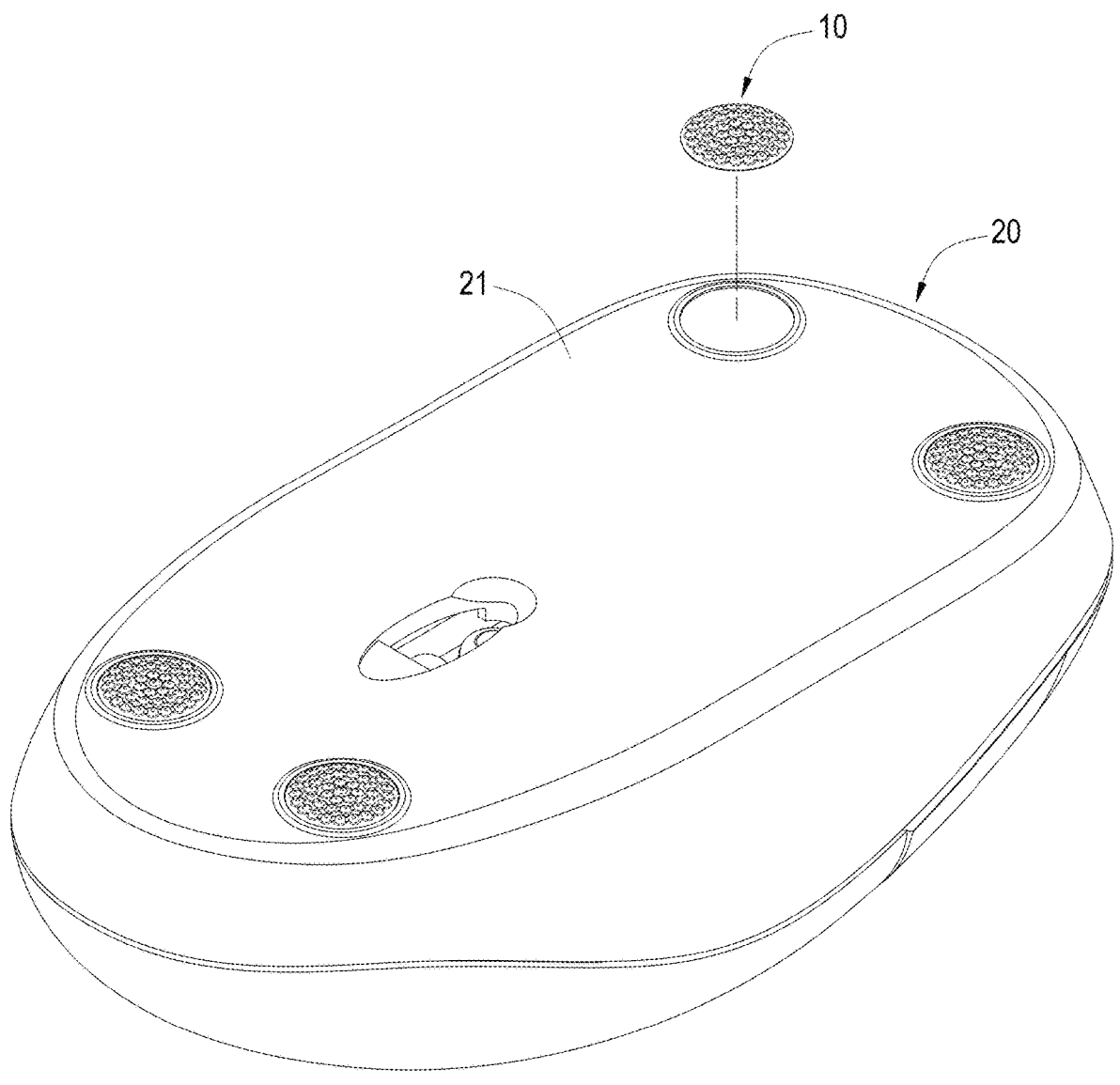
FIG. 3 is a perspective view of a mouse device in accordance with the first embodiment of this disclosure.
Figure 4:
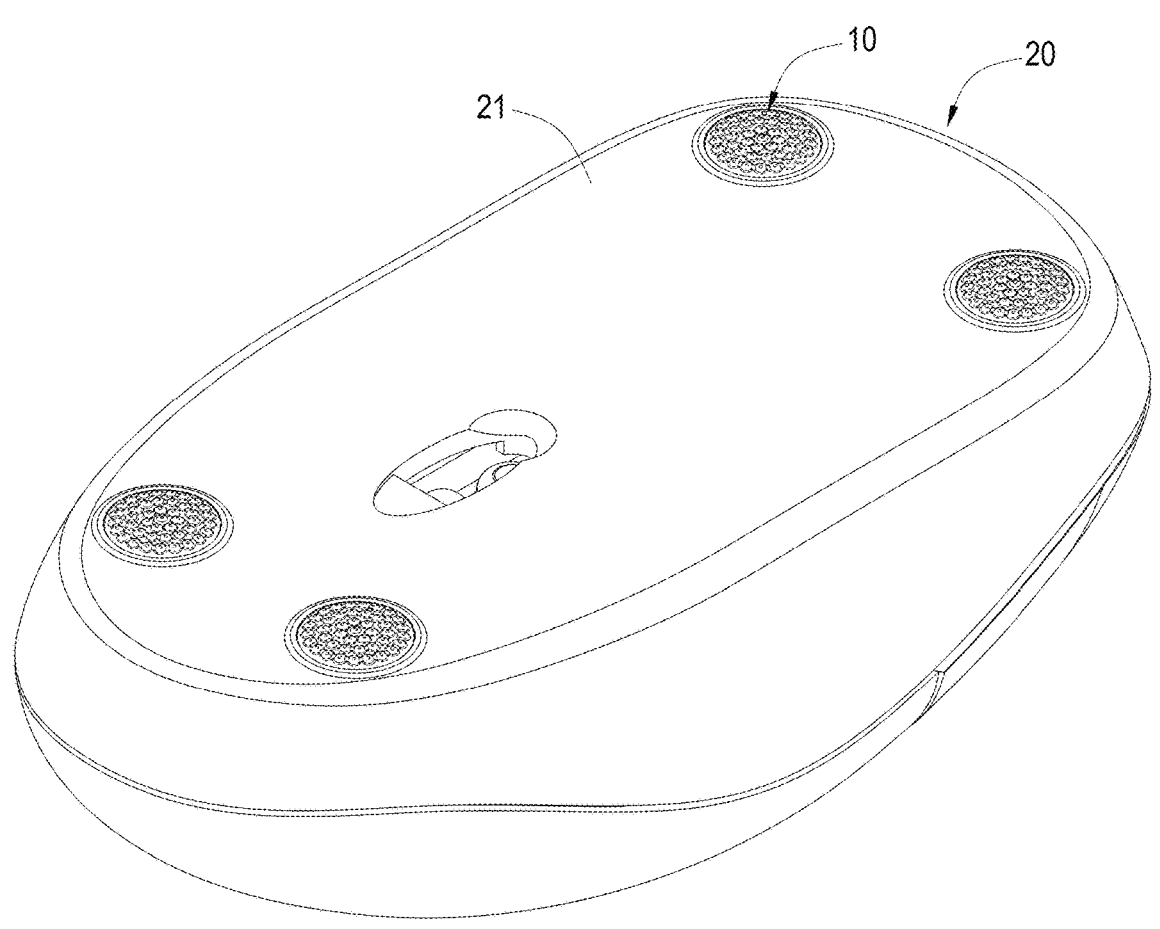
FIG. 4 shows a perspective view and a cross-sectional view of the first embodiment of this disclosure.
Figure 5:
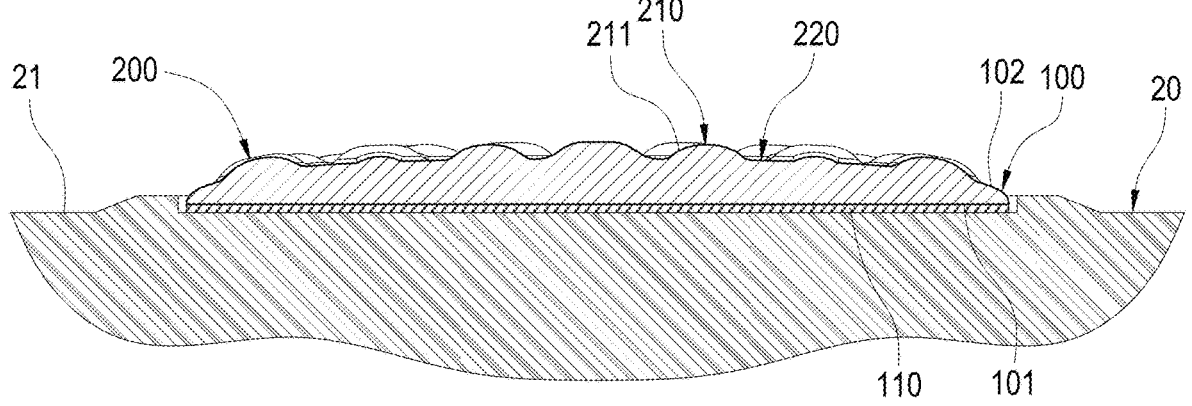
FIG. 5 is a cross-sectional view showing a using a status of a mouse feet in accordance with the first embodiment of the present disclosure.

In FIGS. 3 to 5, the mouse foot 10 of the present disclosure is applied to a mouse device. The adhesive surface 101 of the mouse foot 10 is coated with an adhesive 110, where the adhesive 110 is a laminating or dispensing glue. The mouse device includes a bottom case 20, the bottom case 20 has a bottom surface 21, and the adhesive surface 101 of the mouse foot 10 and the bottom surface 21 of the bottom case 20 are adhered to each other by the adhesive 110. In this embodiment, the bottom surface 21 of the bottom case 20 is attached with a plurality of mouse feet 10, but the present disclosure does not limit the quantity of the mouse feet 10. The boss 200 of each mouse foot 10 protrudes from the bottom surface 21 of the bottom case 20, and the body 100 is embeddable in the bottom surface 21 of the bottom case 20. When the mouse device is used on a tabletop, at least one portion of the convex part 210 of each mouse foot 10 contacts the tabletop. Since the edges of the convex part 210 have rounded corners 211, the convex part 210 is able to rub against the rounded corners 211 in all directions to have a lower resistance when it is moved on the tabletop.

Figure 6:
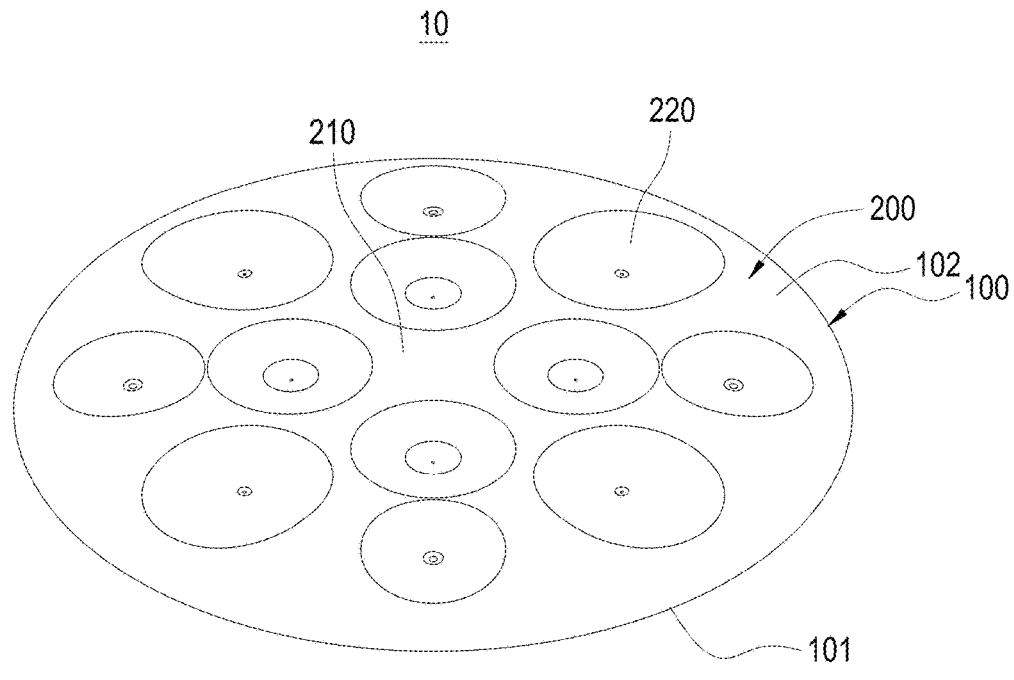
FIG. 6 is a perspective view of a mouse feet in accordance with a second embodiment of the present disclosure.
Figure 7:
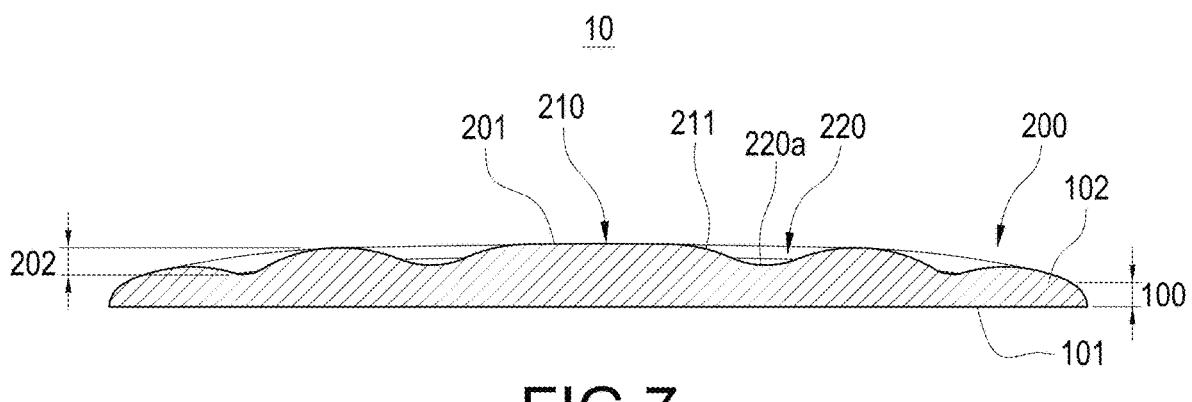
FIG. 7 is a cross-sectional view of a mouse feet in accordance with the second embodiment of the present disclosure.

With reference to FIGS. 6 and 7 for a mouse foot in accordance with the second embodiment of the present disclosure, the mouse foot 10 includes a body 100 and a boss 200. The body 100 has an adhesive surface 101 and a top 102, and the adhesive surface 101 and the top 102 are configured on opposite sides of the body 100 respectively. The boss 200 is arranged on the top 102 of the body 100, and the boss 200 includes at least one convex part 210 and at least one concave part 220 with a height difference 202 between the convex part 210 and the concave part 220 adjacent to each other, and a rounded corner 211 formed on the edge of the convex part 210.

In this embodiment, the body 100 is substantially in the shape of a sheet, the body 100 has an adhesive surface 101 and a top 102, and the adhesive surface 101 and the top 102 are configured on opposite sides of the body 100 respectively. In this embodiment, the adhesive surface 101 is a flat surface, but the present disclosure does not limit the shape of the top 102. The adhesive surface 101 is coated with an adhesive 110, where the adhesive 110 is a laminating or dispensing glue.

The boss 200 is arranged on the top 102 of the body 100, and the body 100 and the boss 200 of this embodiment are integrally formed by plastic molding, but the present disclosure is not limited to such arrangement. The boss 200 includes at least one convex part 210 and at least one concave part 220 with a height difference 202 between the convex part 210 and the concave part 220 adjacent to each other, and a rounded corner 211 formed on an edge of the convex part 210.

In this embodiment, the specific configuration of the convex part 210 and the concave part 220 is described in detail below. The boss 200 includes a convex part 210 and a plurality of concave parts 220, and the convex part 210 surrounds the concave parts 220. In an embodiment, the boss 200 has a top surface 201, the top surface 201 is provided with a plurality of dimples 220a, the top surface 201 is defined as the convex part 210, the dimples 220a are defined as the plurality of concave parts 220, and a rounded corner 211 is formed at the intersection of each dimple 220a and the top surface 201.

In this embodiment, the concave parts 220 are arranged around one of the concave parts 220 (as a center), and other concave parts 220 are arranged into a plurality of ring arrangements around this center. In addition, in at least one of these ring arrangements, the concave parts 220 are symmetrically configured on the boss 200.

The convex part 210 rubs against the rounded corner 211 to have a lower resistance when it is moved in all directions on a tabletop.

Figure 8:
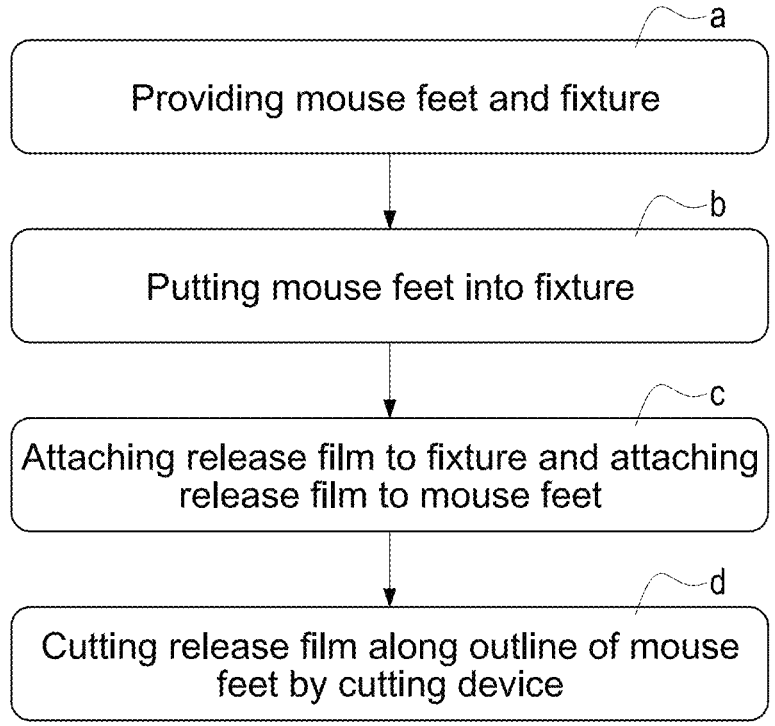
FIG. 8 is a flow chart of a batch manufacturing method of mouse feet replacement assembly in accordance with the present disclosure.
Figures 9, 10, 11:
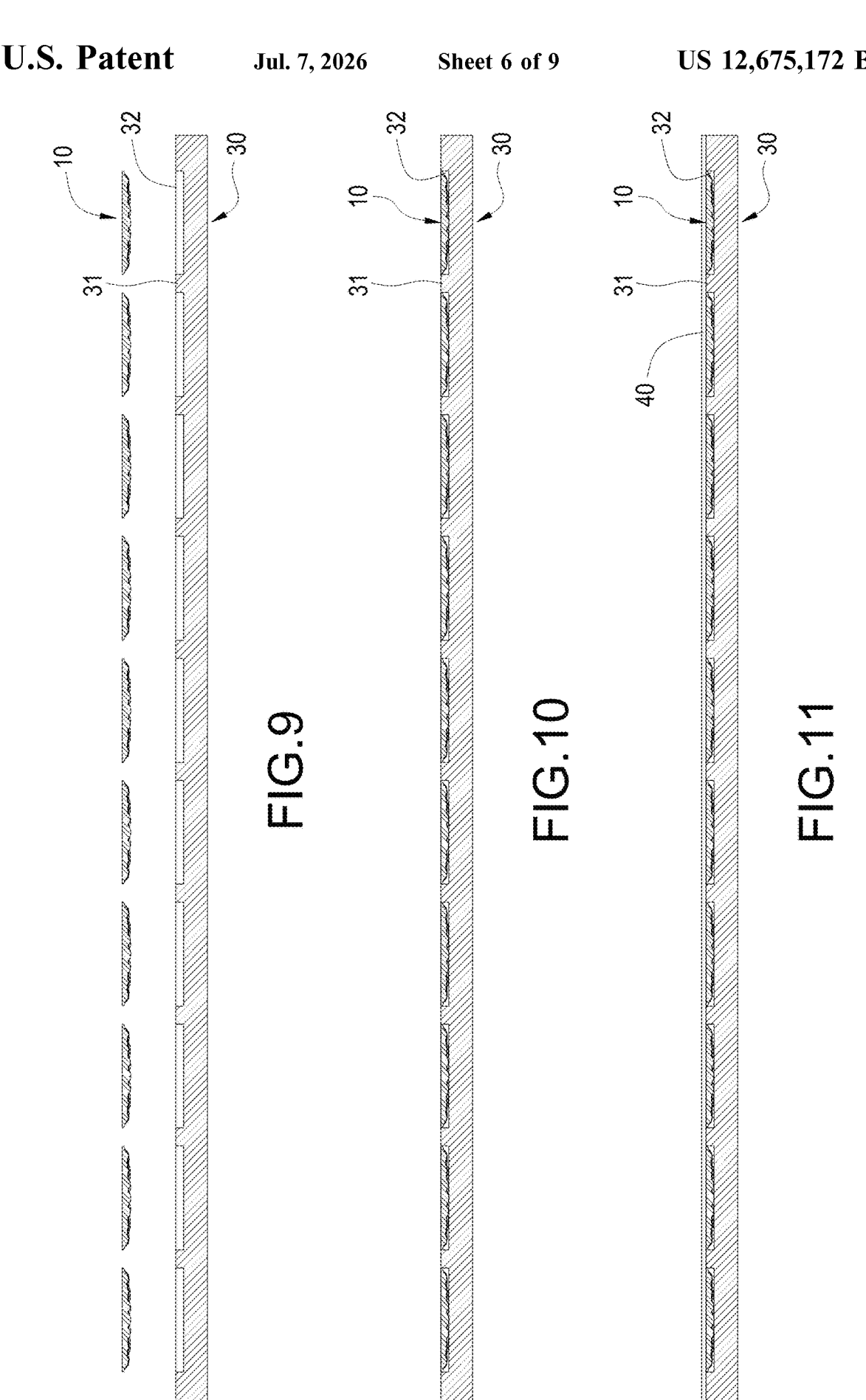
FIG. 9 is a schematic view showing a mouse feet and a fixture in a batch manufacturing method of mouse feet replacement assembly in accordance with the present disclosure.
FIG. 10 is a schematic view showing a mouse feet put in a fixture in a batch manufacturing method of mouse feet replacement assembly in accordance with the present disclosure.
FIG. 11 is a schematic view of an attached release film in a batch manufacturing method of mouse feet replacement assembly in accordance with the present disclosure.

Most of the general replacement feet are formed by cutting rolled sheets. For example, the mouse foot of the present disclosure is a special component, which is generally provided for assembly in a production line. To facilitate transportation, its form may be a large number of mouse feet 10 temporarily attached onto a film, or mouse foot 10 without adhesive 110. Users usually do not have easy access to small quantities of replacement parts. The present disclosure also provides a batch manufacturing method of mouse feet replacement assembly, including the following steps:

In FIGS. 8 and 9, a mouse foot 10 and a fixture 30 are provided in Step a. In this embodiment, a plurality of mouse feet 10 and a fixture 30 are provided, the fixture 30 includes a positioning surface 31 and a plurality of grooves 32 corresponding to the mouse feet 10 respectively, and the grooves 32 are formed on the positioning surface 31.

In FIGS. 1 and 2, the mouse foot 10 of this embodiment includes a body 100 and a boss 200. In this embodiment, the body 100 is in the shape of a sheet and has an adhesive surface 101 and a top 102, and the adhesive surface 101 and the top 102 are configured on opposite sides of the body 100 respectively. In this embodiment, the adhesive surface 101 is a flat surface, but the present disclosure does not limit the shape of the top 102. The adhesive surface 101 is coated with an adhesive 110, where the adhesive 110 is a laminating or dispensing glue.

The boss 200 is arranged on the top 102 of the body 100, and the body 100 and the boss 200 of this embodiment are integrally formed by plastic molding, but the present disclosure is not limited to such arrangement. The boss 200 includes at least one convex part 210 and at least one concave part 220 with a height difference 202 between the convex part 210 and the concave part 220 adjacent to each other, and a rounded corner 211 formed on an edge of the convex part 210.

With reference to FIGS. 8 and 10, the mouse foot 10 is put into the fixture 30 in Step b. In this embodiment, the mouse feet 10 are put into the corresponding grooves 32 respectively, and each adhesive surface 101 of the mouse feet 10 is exposed from the positioning surface 31. In addition, each adhesive surface 101 is substantially flush with the positioning surface 31.

Figure 12:
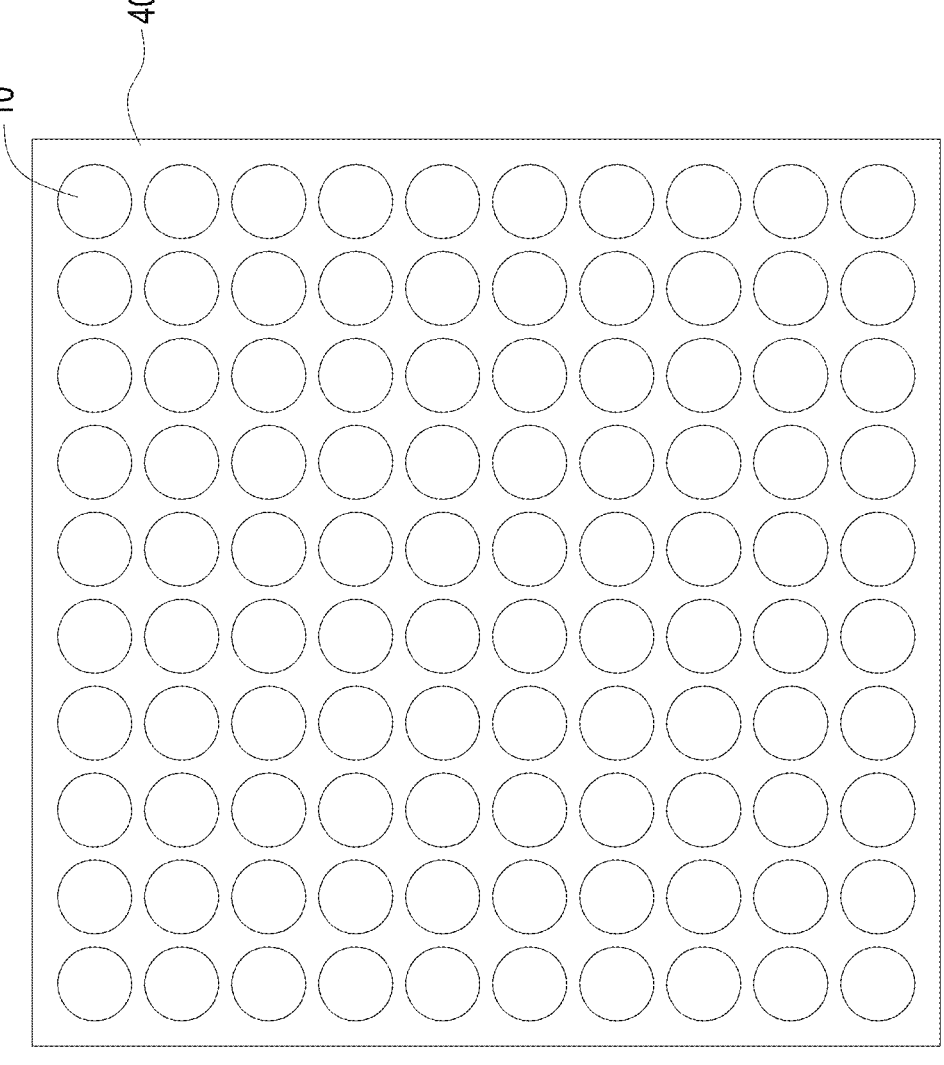
FIG. 12 is a schematic view of a release film attached to a mouse feet in a batch manufacturing method of mouse feet replacement assembly in accordance with the present disclosure.

In FIGS. 8, 11 and 12, a release film 40 is attached in Step c. A release film 40 is provided and attached to the positioning surface 31 and the adhesive surface 101 of each mouse foot 10 is attached. In this embodiment, the adhesive surface 101 of each mouse foot 10 is adhered to the release film 40 by the adhesive 110, but the positioning surface 31 is used to position the release film 40 to make it to be flush with each adhesive surface 101, and the release film 40 is not adhered to the positioning surface 31.

Figures 13, 14, 15:
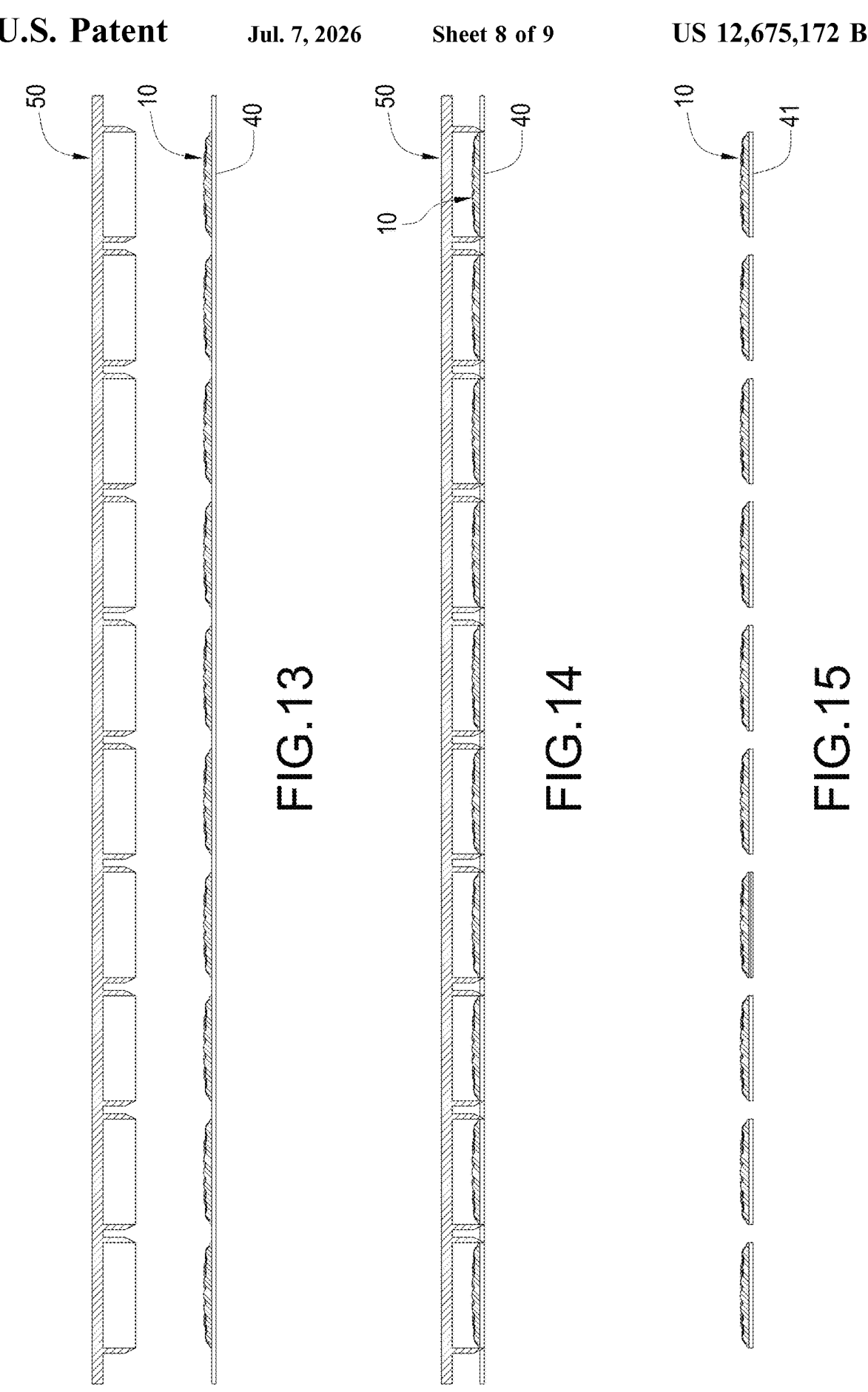
FIGS. 13 and 14 are schematic views of cutting a release film in a batch manufacturing method of mouse feet replacement assembly in accordance with the present disclosure.
FIG. 15 is a schematic view of a replacement mouse feet in a batch manufacturing method of mouse feet replacement assembly in accordance with the present disclosure.

In FIGS. 8, 13 and 14, a release film 40 is cut in the last step (Step d). In this embodiment, a cutting device 50 is provided first as shown in FIG. 13, and then the cutting device 50 cuts the release film 40 along the outline of the mouse feet 10 as shown in FIG. 14, where the outline of each mouse foot 10 specifically refers to the outline of the adhesive surface 101 of each mouse foot 10. In this embodiment, the cutting device 50 has a knife 51, the shape of the knife 51 corresponds to the outline of the adhesive surface 101 of the mouse feet 10.

In this embodiment, the release film 40 together with the mouse feet 10 are removed from the fixture 30 and placed flatly, and then the surface of the release film 40 having the mouse feet 10 is exposed to the outside. The knife 51 is aligned with the outline of each mouse foot 10 and then the knife 51 is used to punch the exposed surface of the release film 40. However, the cutting device 50 of the present disclosure is not limited to such arrangement. For example, the cutting device 50 may also be a laser cutting device, the release film 40 together with the mouse feet 10 are put into the laser cutting device and the release film 40 is cut along the outline of the mouse feet 10 by laser.

In FIG. 15, the aforementioned step is used to cut the release film 40 along the outline of the adhesive surface 101 of the mouse feet 10 to complete the plurality of release sheets 41, and the release sheets 41 are attached to the mouse feet 10 respectively to form the replacement components, and the release sheet 41 is attached to the adhesive surface 101 of each mouse foot 10 to protect the adhesive surface 101. In this way, the replacement components of the mouse foot 10 of the present disclosure are manufactured by batch production.

Figure 16:
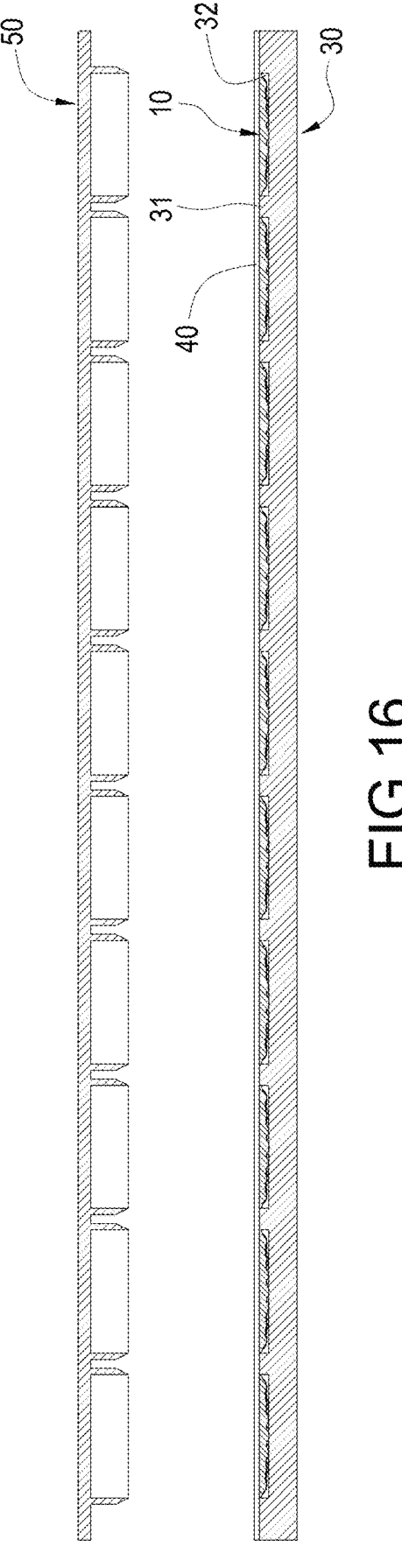
FIG. 16 is a schematic view of cutting a release film by another method in a batch manufacturing method of mouse feet replacement assembly in accordance with the present disclosure.

With reference to FIG. 16 for another cutting method in accordance with an embodiment of the present disclosure, when the release film 40 is cut along the outline of the adhesive surface 101 of the mouse feet 10, the release film 40 has not been removed from the fixture 30. The cutting device 50 with the knife 51 is aligned with the outline of each mouse foot 10, and knife 51 is used to punch the positioning surface 31 to complete the plurality of release sheets 41, and the release sheets 41 are attached to the adhesive surfaces 101 of the mouse feet 10 respectively, so that before each mouse foot 10 is installed to the bottom surface 21 of the bottom case 20 as shown in FIGS. 3 and 4, the release sheet 41 protects the adhesive surface 101.

What is claimed is:

1. A mouse foot, comprising:
   a body, comprising an adhesive surface and a top arranged on two sides thereof opposite to each other; and
   a boss, arranged on the top of the body, and comprising at least one convex part and a plurality of concave part, a height difference defined between the convex part and the concave part adjacent to each other, and a rounded corner disposed on an edge of the convex part, wherein the convex part surrounds the concave parts.

2. The mouse foot according to claim 1, wherein the concave parts are arranged concentrically.

3. The mouse foot according to claim 1, wherein the concave parts are dimples.

4. The mouse foot according to claim 1, wherein an adhesive is disposed on the adhesive surface.

5. A mouse device, comprising:
   a bottom case, comprising a bottom surface; and
   a plurality of mouse feet according to claim 1, installed on the bottom surface.

6. The mouse device according to claim 5, wherein an adhesive is disposed on the adhesive surface, and the adhesive surface is adhered to the bottom surface by the adhesive.

\* \* \* \* \*